United States Patent Office 3,202,458
Patented Aug. 24, 1965

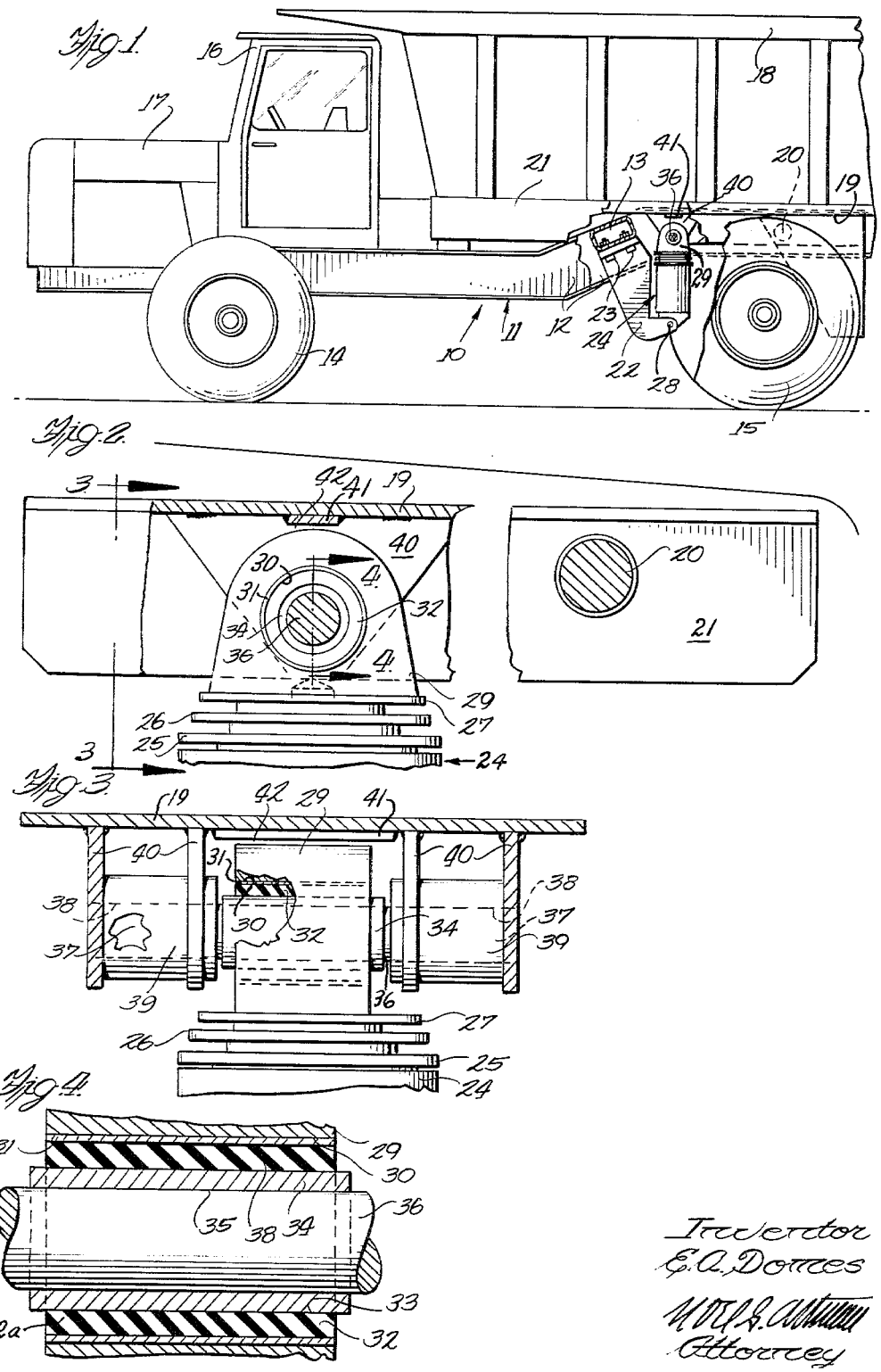

3,202,458
RESILIENT SNUBBING CONNECTION BETWEEN THE TILTING BODY AND THE HOIST CYLINDER
E. A. Domes, Wheaton, Ill., assignor to International Harvester Company, Chicago, Ill., a corporation of New Jersey
Filed Sept. 28, 1962, Ser. No. 226,965
2 Claims. (Cl. 298—22)

This invention relates to a vehicle of a type having a dump body and more particularly to an improved mechanism for raising and lowering the dump body. More specifically, the invention relates to an improved cushioning device or elastic connecting mechanism for connecting a fluid extensible device to a dump body of a vehicle.

The raising and lowering of dump bodies is generally achieved by the utilization of fluid extensible devices which are supported on the chassis and which are connected to the dump body. Such fluid extensible devices are generally multi-stage cylinders including two or three sections which extend and retract during the dumping operation of the dump body. During the full extension of the extensible device, as the cylinder is reaching its maximum extension, the movement in an upward direction increases sharply during the final stage of extension. This causes greatly increased stress and impact forces on the mechanism which connects the fluid extensible device to the body and chassis of the vehicle and frequently is the cause of structural failure of the parts. Also, during the lowering of the dump body and upon retraction of the cylinder, impact forces occur which in time may result in structural failures. Different devices and constructions have been utilized to achieve snubbing of the cylinders so that these impact forces are decreased. One manner in which this snubbing has been achieved is to restrict the flow of the fluid during the final stage of extension, thus decreasing the velocity of movement of the final stage. However, this in turn slows down the dump cycle to an undesirable extent. Other structural changes in the hydraulic cylinders have been tried with limited success.

It is therefore a prime object of this invention to provide an improved and simplified connection for connecting an extensible cylinder to the dump body so as to achieve a cushioning action with a resultant decrease in the impact forces during operation.

A further object is to provide an improved construction for attaching a hoist cylinder between a chassis frame and a dump body, the said construction including a resilient connection to assist in the absorption of the forces and stresses encountered during raising and lowering of the dump body.

A more specific object is the provision of a resilient or elastic connection between a multi-stage hydraulic hoist cylinder and a connecting bracket connecting the said cylinder to the underneath side of a dump body.

These and other objects will become more readily apparent from a reading of the description when examined in connection with the accompanying sheet of drawing.

In the drawing:

FIGURE 1 is a side elevational view of a vehicle having a dump body with portions of the vehicle being broken away to illustrate the mounting of a lift cylinder for raising the body;

FIGURE 2 is an enlarged detail view partially in section of a connecting attachment for connecting the upper end of a fluid-extensible device to a dump body;

FIGURE 3 is a cross-sectional view taken along the line 3—3 of FIGURE 2; and

FIGURE 4 is a cross-sectional view taken along line 4—4 of FIGURE 2.

Referring now to FIGURE 1 a dump truck is generally designated by the reference character 10 and includes a longitudinally extending chassis frame 11 comprising a pair of transversely spaced longitudinally extending frame members 12. The frame 11 is suitably supported on front steerable wheels 14 and rear wheels 15. An operator's cab 16 is supported on the frame 11 and is disposed to the rear of an engine compartment designated at 17.

A dump body 18 is supported on the frame 11 and includes a bottom 19, the said body 18 including a pivot member 20 supported in flanges 21 projecting downwardly from the bottom 19 on opposite sides of the body, the said pivot member 20 being suitably supported on the longitudinal frame members 12. A bracket 22 is securely connected to the transverse box beam 13 by means of bolt-and-nut connectors 23. A hydraulic extensible member comprising a multi-stage cylinder 24 comprises a plurality of extensible sections 25, 26, and 27, and the multi-stage cylinder 24 is connected to the bracket 22 by means of a pivot bolt 28, as shown in FIGURE 1. The multi-stage cylinder 24 is of conventional construction which by means of a hydraulic power system (not shown) provides for the full extension and retraction of the sections 25, 26, and 27 to raise and lower the dump body about the pivot member 20.

As best shown in FIGURES 2 and 3, a trunnion 29 is provided on the upper end of the extensible section 27, the said trunnion 29 including a transverse bore 30 within which a metal sleeve 31 is positioned. The sleeve 31 supports a resilient cylindrical member 32 having a transverse opening or bore 33. The resilient member 32 may consist of rubber, neoprene, or any other suitable resilient material which is capable of being compressible, cushioning and absorbing shock impact loads. A cylindrical bearing 34 is positioned within the opening 33 and a shaft 36 is journaled within a bore 35 of the bearing 34. The shaft 36 includes outwardly projecting shaft portions 37 supported in openings 38 of transversely spaced supporting blocks 39. The supporting blocks 39 are secured to the bottom 19 by means of bracket elements 40. An impact or a thrust-receiving member 41 is secured to the underneath side of the bottom 19 immediately above the trunnion 29. The impact member 41 is spaced slightly above the trunnion 29 a predetermined distance as indicated at 42 to form a stop means that limits the movement of trunnion 29.

In operation, fluid under pressure is introduced into the fluid-extensible device 24 whereupon the sections 25, 26, and 27 extend and move upwardly thereby raising the dump body 18. During the extension of the sections the lower portion as at 32a (FIGURE 4) of the resilient cylindrical member 32 is compressed and the trunnion 29 will engage the impact member 41 whereupon further compression of the resilient cylindrical member ceases. As the extensions become fully extended and particularly during the final extension of the section 27 there is an increase in the velocity of movement, which in the conventional rigid construction of a multi-stage cylinder to the dump body, causes excessive shock loads at the point of full extension. These shock forces are absorbed by the cylindrical member 32 which serves as a cushion so as to decrease the possibility of structural failure which might result from the forces encountered during this phase of the operation. Similarly, as the empty dump body is returned to its normal position and the sections 25, 26 and 27 are retracted, the resilient member 32 serves to cushion the forces during the descent of the body 18.

Thus, an improved connection for connecting a multi-stage cylinder to a truck dump body has been disclosed and described and the resilient or elastic connection provides for maintenance free operation. The objects of the invention have thus been fully achieved and it must be understood that changes and modifications may be made without departing from the spirit of the invention as disclosed or from the scope thereof as defined in the appended claims.

What is claimed is:

1. In a vehicle having a longitudinally extending chassis frame, and a dump body on said frame movable from a lowered to a raised dump position;
    (a) a lifting device comprising,
    (b) a fluid extensible device,
    (c) means pivotally connecting said extensible device to said frame below said dump body,
    (d) an extensible and retractable member on said extensible device,
    (e) a trunnion on said extensible and retractable member,
    (f) said trunnion including a first bore extending transversely with respect to said frame,
    (g) bracket means connected to and projecting from said body,
    (h) a sleeve carried within said first bore,
    (i) a cylindrical compressible member having a transverse opening and being carried within said sleeve,
    (j) a cylindrical bearing having a second transverse bore and being supported within said opening of said cylindrical compressible member,
    (k) a shaft carried by said bearing within said second bore, said shaft being supported by said bracket means,
    (l) and an impact plate-forming stop means on said body spaced above said trunnion a predetermined distance and engageable by said trunnion during movement of said extensible and retractable member to limit the end movement of the first bore with respect to the bearing and the shaft, thereby preventing complete compression of said cylindrical compressible member whereby said cylindrical compressible member retains sufficient resiliency to cushion the dump body as it moves between its lowered and raised position.

2. In a vehicle having a longitudinally extending chassis frame and a dump body on said frame movable from a lowered to a raised position;
    (a) a lifting device for said body comprising,
    (b) a fluid extensible device,
    (c) means connecting said extensible device to said frame below said body,
    (d) extensible and retractable means on said extensible device,
    (e) said extensible and retractable means including an end portion having a horizontal bore,
    (f) a hollow cylindrical member disposed in said bore,
    (g) compressible means resiliently mounting said cylindrical member in said bore,
    (h) a shaft rotatably carried in said cylindrical member and projecting laterally outwardly therefrom,
    (i) means connecting said shaft to said body, and
    (j) stop means on said body spaced a predetermined distance from said end portion engageable by said end portion during extension of said extensible and retractable means to limit the movement of the end portion with respect to the shaft, thereby preventing complete compression of said compressible means whereby said compressible means retains sufficient resiliency to cushion the dump body as it moves between its lowered and raised position.

References Cited by the Examiner

UNITED STATES PATENTS

| 1,833,002 | 11/31 | Smith | 105—193 |
| 2,476,694 | 7/49 | Bourne-Vanneck | 298—20 |
| 2,593,776 | 4/52 | Margala | 298—20 |
| 2,730,401 | 1/56 | Rea | 298—22 |
| 2,808,277 | 10/57 | Binder | 308—3.5 |

FOREIGN PATENTS

| 653,982 | 1951 | Great Britain. |
| 780,233 | 1957 | Great Britain. |

EUGENE G. BOTZ, *Primary Examiner.*

LEO QUACKENBUSH, *Examiner.*